US012732709B2

(12) United States Patent
Lee et al.

(10) Patent No.: US 12,732,709 B2
(45) Date of Patent: Sep. 8, 2026

(54) COMPUTATION POWER ALLOCATION METHOD AND COMPUTATION POWER ALLOCATION SYSTEM CAPABLE OF TRACKING IMAGE FRAMES

(71) Applicant: MEDIATEK INC., Hsinchu City (TW)

(72) Inventors: Chia-Chi Lee, Hsinchu City (TW); Che-Hsi Kuo, Hsinchu City (TW); Yao-Sheng Chen, Hsinchu City (TW); Caigao Tang, Chengdou City (CN); Po-Ting Chen, Hsinchu City (TW); Wenxiang Zhong, Chengdou City (CN); Yi-Tsung Lin, Hsinchu City (TW); Nien-Hsien Lin, Hsinchu City (TW); Cheng-Han Tsai, Hsinchu City (TW); Cheng-Che Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 23 days.

(21) Appl. No.: 19/044,646

(22) Filed: Feb. 4, 2025

(65) Prior Publication Data

US 2026/0230716 A1 Aug. 6, 2026

(51) Int. Cl.

| | |
|---|---|
| ***H04N 23/80*** | (2023.01) |
| ***G06F 9/30*** | (2018.01) |
| ***G06F 9/50*** | (2006.01) |
| ***G06F 9/54*** | (2006.01) |
| ***H04N 7/01*** | (2006.01) |

(52) U.S. Cl.
CPC ......... *H04N 23/80* (2023.01); *G06F 9/30123* (2013.01); *G06F 9/5077* (2013.01); *G06F 9/544* (2013.01); *H04N 7/013* (2013.01)

(58) Field of Classification Search
None
See application file for complete search history.

(56) References Cited

U.S. PATENT DOCUMENTS

2021/0081249 A1* 3/2021 Gao ...................... G06F 9/4881
2022/0093056 A1* 3/2022 Macias .................. G09G 5/395
2023/0410767 A1* 12/2023 Chen ........................ G09G 3/36
2024/0311951 A1* 9/2024 Panneer .................... G06T 1/20

FOREIGN PATENT DOCUMENTS

CN 118193175 A * 6/2024 ........... G06F 9/5072
CN 118585297 A * 9/2024 ........... G06Q 10/103

* cited by examiner

*Primary Examiner* — Paul M Berardesca
(74) *Attorney, Agent, or Firm* — Winston Hsu

(57) ABSTRACT

A computation power allocation method includes acquiring a plurality of buffer queues of an operating system framework, identifying a target task required to perform an image frame boosting process from a plurality of tasks according to the plurality of buffer queues, acquiring a start time point and an end time point of each image frame generated by the target task, allocating computation power to each image frame of the target task during a time interval from the start time point to the end time point, estimating an expected frame duration of the target task according to an expected frame rate of the target task, and generating a required computational workload of the target task according to the expected frame duration of the target task. Each buffer queue of the plurality of buffer queues is used for communicating application programming interfaces of pair-wised tasks.

20 Claims, 5 Drawing Sheets

COMPUTATION POWER ALLOCATION METHOD AND COMPUTATION POWER ALLOCATION SYSTEM CAPABLE OF TRACKING IMAGE FRAMES

BACKGROUND

With the rapid development of science and technology, dynamic motion images with a high frame per second (FPS) are introduced to various video applications. Particularly, high FPS images require large calculation power and high power consumption. However, when a third-party camera scene is applied to generate the high FPS images, the performance of the third-party camera is insufficient. Further, when a screen slide scene is executed, the calculation power may be wasted since a wide frame cannot be accurately detected for allocating the calculation power.

Therefore, developing a computation power allocation method capable of accurately detecting and tracking image frames is an important design issue.

SUMMARY

In an embodiment of the present invention, a computation power allocation method is disclosed. The computation power allocation method comprises acquiring a plurality of buffer queues of an operating system framework, identifying a target task required to perform an image frame boosting process from a plurality of tasks according to the plurality of buffer queues, acquiring a start time point and an end time point of each image frame generated by the target task, allocating computation power to each image frame of the target task during a time interval from the start time point to the end time point, estimating an expected frame duration of the target task according to an expected frame rate of the target task, and generating a required computational workload of the target task according to the expected frame duration of the target task. Each buffer queue of the plurality of buffer queues is used for communicating application programming interfaces of pair-wised tasks.

In another embodiment of the present invention, a computation power allocation system is disclosed. The computation power allocation system comprises an operating system framework configured to provide an application platform of performing a plurality of tasks, a processor linked to the operating system framework, and a memory coupled to the processor. The processor acquires a plurality of buffer queues of the operating system framework. The processor identifies a target task required to perform an image frame boosting process from the plurality of tasks according to the plurality of buffer queues. The processor acquires a start time point and an end time point of each image frame generated by the target task. The processor allocates computation power to each image frame of the target task during a time interval from the start time point to the end time point. The processor estimated an expected frame duration of the target task according to an expected frame rate of the target task. The processor generates a required computational workload of the target task according to the expected frame duration of the target task. The expected frame duration, the expected frame rate, and the required computational workload are saved in the memory. Each buffer queue of the plurality of buffer queues is used for communicating application programming interfaces of pair-wised tasks.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
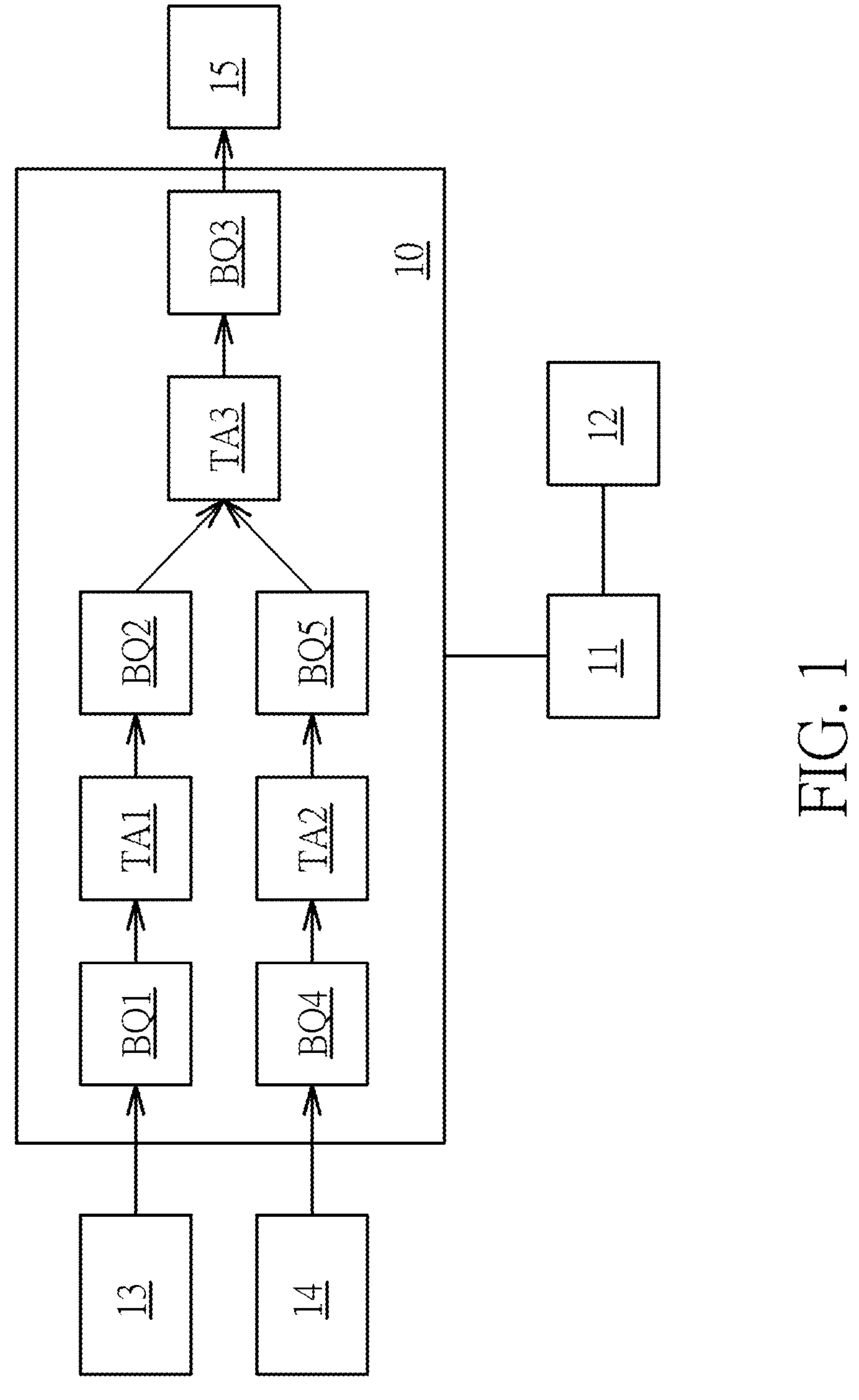
FIG. 1 is a block diagram of a computation power allocation system according to an embodiment of the present invention.

FIG. 1 is a block diagram of a computation power allocation system 100 according to an embodiment of the present invention. The computation power allocation system 100 includes an operating system framework 10, a processor 11, and a memory 12. The operating system framework 10 is used for providing an application platform of performing a plurality of tasks. The processor 11 is linked to the operating system framework 10. The memory 12 is coupled to the processor 11. The computation power allocation system 100 can include various external data sources. For example, the computation power allocation system 100 can include a camera hardware abstraction layer (camera HAL) 13 linked to camera framework application programming interfaces (APIs). The computation power allocation system 100 can include a media codec process 14 for receiving and encoding external media data through media framework APIs. In the computation power allocation system 100, the processor 11 can acquire a plurality of buffer queues BQ1 to BQ5 of the operating system framework 10. Then, the processor 11 can identify a target task required to perform an image frame boosting process from the plurality of tasks according to the plurality of buffer queues BQ1 to BQ5. The processor 11 can acquire a start time point and an end time point of each image frame generated by the target task. The processor 11 can allocate computation power to each image frame of the target task during a time interval from the start time point to the end time point. The processor 11 can estimate an expected frame duration of the target task according to an expected frame rate of the target task. The processor 11 can generate a required computational workload of the target task according to the expected frame duration of the target task. Finally, the processed image frames can be outputted to a surface flinger 15 for displaying on a screen. Here, the expected frame duration, the expected frame rate, and the required computational workload can be saved in the memory 12. Each buffer queue of the plurality of buffer queues BQ1 to BQ5 can be used for communicating application programming interfaces of pair-wised tasks. Details of the computation power allocation system 100 are illustrated below.

Figure 2:
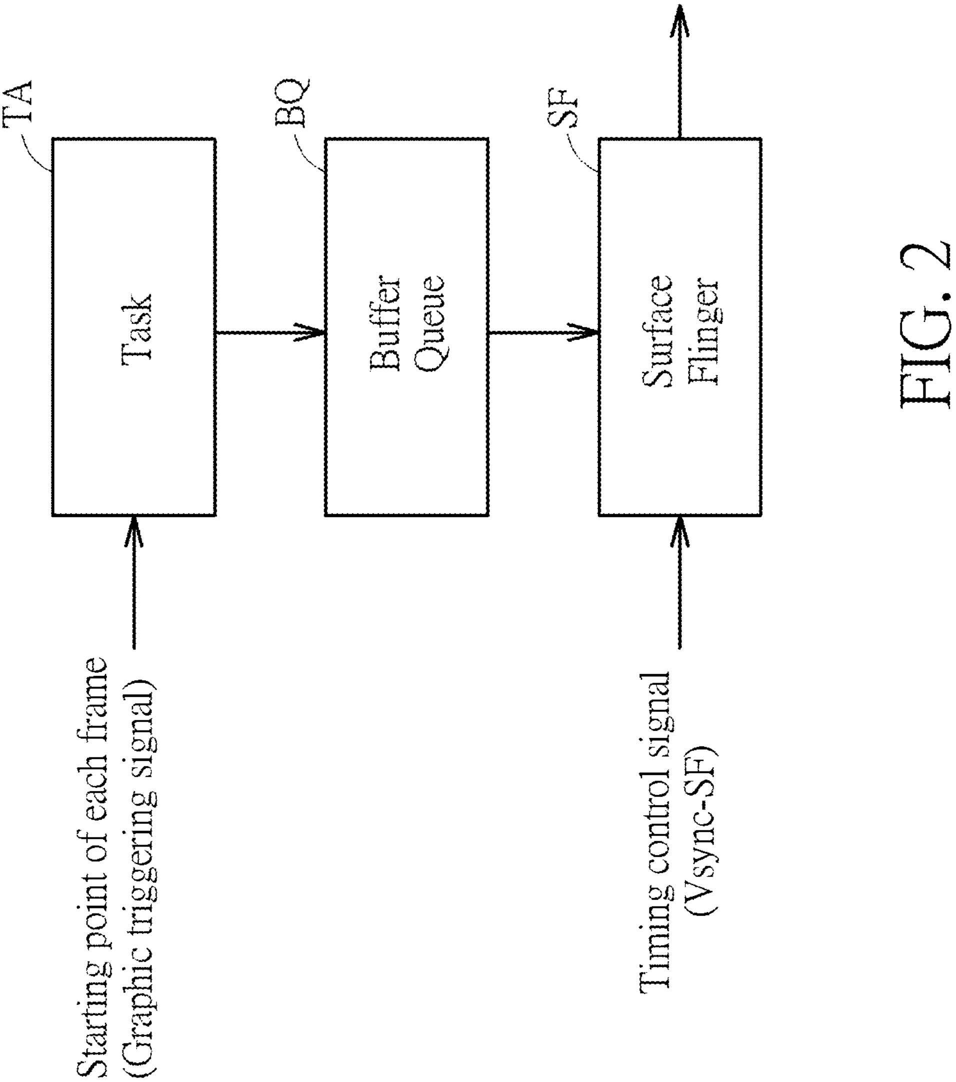
FIG. 2 is an illustration of a high FPS image scenario and a buffer queue application of the computation power allocation system in FIG. 1.

FIG. 2 is an illustration of a high FPS image scenario and a buffer queue application of the computation power allocation system 100. As previously mentioned, the buffer queue can be used for communicating APIs of pair-wised tasks. For example, a graphic triggering signal can be received by a task TA. The graphic triggering signal can be a vertical synchronization signal application program (Vsync-app), an end function of a camera operation, or an App timer. The task TA can be an image processing App. After the graphic triggering signal is received by the task TA, the task TA can process image frames and then output the processed image frames to the buffer queue BQ. In other words, the task TA can provide producer information to the buffer queue BQ. In FIG. 2, a surface flinger 15 can read data from the buffer queue BQ. The surface flinger 15 can be regarded as another task for receiving a timing control signal (i.e., a vertical synchronization surface flinger (Vsync-SF) signal) and creating a layer to manipulate an appearance of an App on the screen. In other words, the surface flinger 15 can be regarded as a consumer of the buffer queue BQ. Here, the operating system framework 10 can be an Android® framework, but is not limited thereto.

Figure 3:
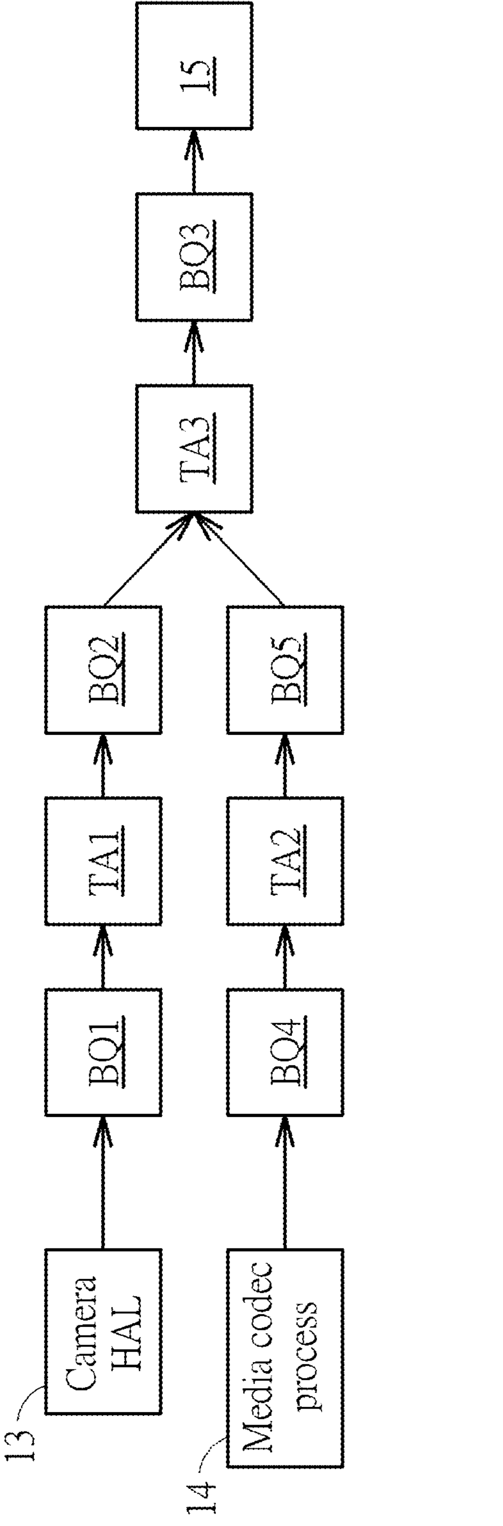
FIG. 3 is an illustration of programming applications performed by communicating a plurality of tasks of the computation power allocation system in FIG. 1.

FIG. 3 is an illustration of programming applications performed by communicating a plurality of tasks of the computation power allocation system 100. In FIG. 3, external media data can be generated by a camera (hereafter, say, "camera media data"). The camera HAL 13 is linked to a camera framework API. When a task of a camera function is performed, the camera media data and configuration data (i.e., such as an expected frame rate) can be transmitted to the buffer queue BQ1. A task TA1 can be a camera image processing task controlled by the processor 11. The task TA1 can read data from the buffer queue BQ1. After the task TA1 generates processed camera image frames. The processed camera image frames can be transmitted to the buffer queue BQ2. In FIG. 3, a media codec process 14 can be introduced for receiving and encoding external media data through the media framework APIs. The encoded media data can be transmitted to the buffer queue BQ4. A task TA2 can be a video stream processing task. After the task TA2 generates processed video image frames, the processed video image frames can be transmitted to the buffer queue BQ5. Further, a task TA3 can be a flutter task for synthesizing a plurality of image frames accessed from the buffer queue BQ2 and the buffer queue BQ5. The synthesized image frames can be transmitted to the buffer queue BQ3. Finally, the surface flinger 15 can read data from the buffer queue BQ3 for displaying the synthesized image frames. Here, the structure of tasks and buffer queues can correspond to a programming application, such as a WeChat App, but is not limited thereto. Any reasonable architecture of tasks and buffer queues of the operating system framework 10 falls into the scope of the present invention.

In the computation power allocation system 100, the processor 11 can acquire producer information and consumer information of each buffer queue. Then, the processor 11 can identify the target task required to perform the image frame boosting process from the plurality of tasks according to the producer information of each buffer queue. For example, in FIG. 3, the producer information (i.e., generated by the camera HAL 13) includes a frame rate configuration, such as 15 FPS. The processor 11 can acquire a scenario configured by producer information of the buffer queue BQ1. Then, the processor 11 can acquire an expected frame rate (15 FPS) corresponding to the scenario configured by the producer information. When a real frame rate of the task of performing the camera function needs to be boosted, the processor 11 can set the task of performing the camera function as the target task required to perform the image frame boosting process. In the computation power allocation system 100, the target task can be the task of performing a camera function or a task of performing a screen slide function, but is not limited thereto. Any target task required to perform the image frame boosting process detected by the processor 11 falls into the scope of the present invention.

After the target task required to perform the image frame boosting process is detected, the processor 11 can allocate the computation power to each image frame of the target task. Details of tracking each image frame of the target task are illustrated below.

Figure 4:
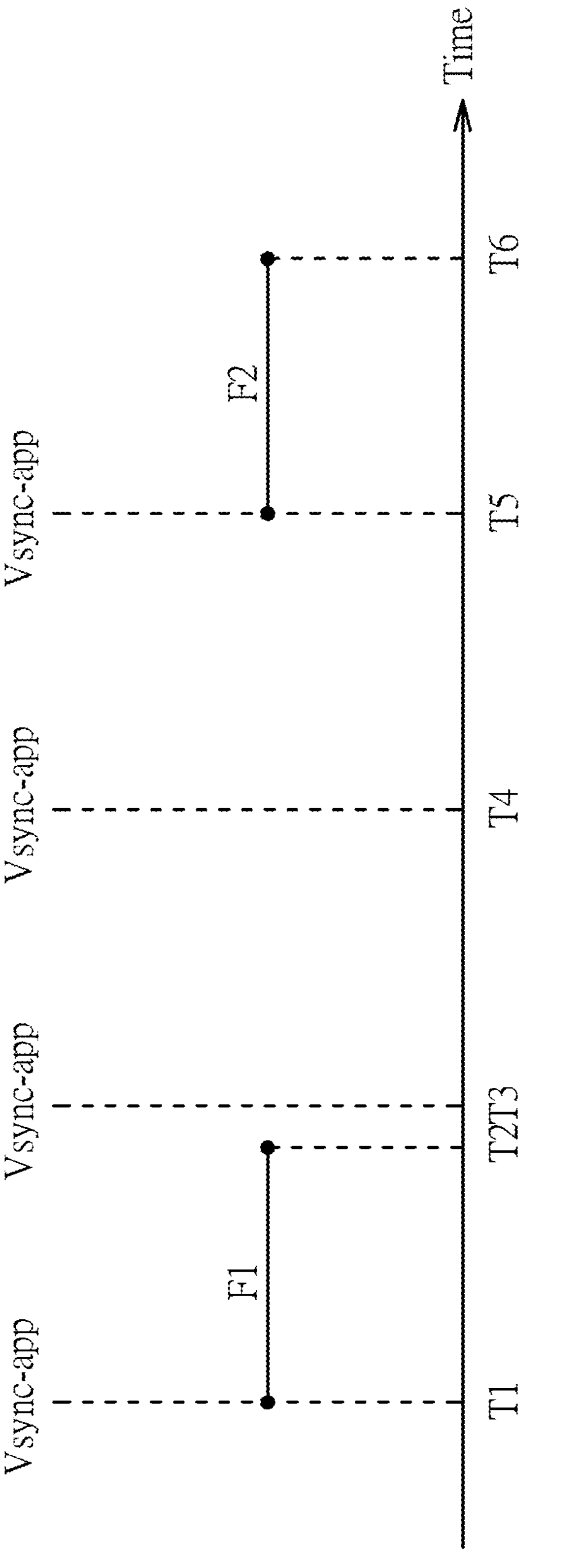
FIG. 4 is an illustration of tracking image frames of the computation power allocation system in FIG. 1.

FIG. 4 is an illustration of tracking image frames of the computation power allocation system 100. As previously mentioned, the target task of the operating system framework 10 can include the task of performing the camera function or the task of performing the screen slide function. When the target task corresponds to the screen slide function, image frames are discontinuously generated. As a result, the processor 11 can acquire the start time point and the end time point of each image frame from the operating system framework 10. For example, in FIG. 4, X-axis is a time axis. A start time point of a first frame F1 is detected at a time point T1 of the Vsync-app signal. An end time point of the first frame F1 is detected at a time point T2. No image frame is generated during a time interval from a time point T3 to a time point T5. A start time point of a second frame F2 is detected at the time point T5 of the Vsync-app signal. An end time point of the second frame F2 is detected at a time point T6. As a result, when the screen slide function generates the image frames F1 and F2 during a first time interval from the time point T1 to the time point T2, and a second time interval from the time point T5 to the time point T6, the computation power can be allocated to the screen slide function during the first time interval and the second time interval. Conversely, when the screen slide function is temporarily ceased from the time point T2 to the time point T5, no computation power is allocated to the screen slide function.

In the embodiment, Vsync-app can be a timing control signal of the application program that triggers an image processing application or task (referred to as task TA). This signal initiates the processing of image frames within the application. Vsync-SF relates to the Surface Flinger component. The Surface Flinger is responsible for creating layers and manipulating the appearance of an application on the screen. Thus, Vsync-SF could be the timing control signal that synchronizes the Surface Flinger's operations with the display refresh rate.

When the target task corresponds to the task of performing a camera function, image frames are generated according to camera configurations. Here, the image frames are indicated to image frames of camera HAL 13. Therefore, the processor 11 can allocate the computation power to each image frame of the target task during a period of generating the image frames. In other words, when the target task corresponds to the task of performing the camera function, the start time point and the end time point of each image frame are two terminals of the period of generating the image frames. As a result, the computation power can be allocated accordingly. After the computation power is allocated, the processor 11 can boost a frame rate to reach the expected frame rate when no event is triggered by consumer information of the buffer queue. Then, each image frame can be inputted to a corresponding buffer queue after the computation power is allocated for generating each image frame. In the computation power allocation system 100, the processor 11 can optionally perform the image frame boosting process to a specific task. For example, in FIG. 3, the processor 11 can optionally perform the image frame boosting process to the flutter task (TA3) when the flutter task is used for synthesizing the plurality of image frames generated by different image sources. Any reasonable technology modification falls into the scope of the present invention.

Further, the processor 11 can estimate the expected frame duration of the target task according to an expected frame rate of the target task. For example, the expected frame duration can be written as:

$$\text{expected frame duration} = \frac{1}{\text{expected frame rate}}$$

The processor 11 can also generate a required computational workload of the target task according to the expected frame duration of the target task. For example, an estimation of computational power of the required computational workload can be written as:

$$\text{estimation of computational power} = \frac{\text{previous frame (processing frequency} \times \text{time duration)}}{\text{expected frame duration}}$$

Here, the previous frame (processing frequency×time duration) denotes an integration of the processing frequency and the time duration of the previous frame. Since the estimation of computational power of the required computational workload can be accurately acquired, the performance of power management can be improved.

Figure 5:
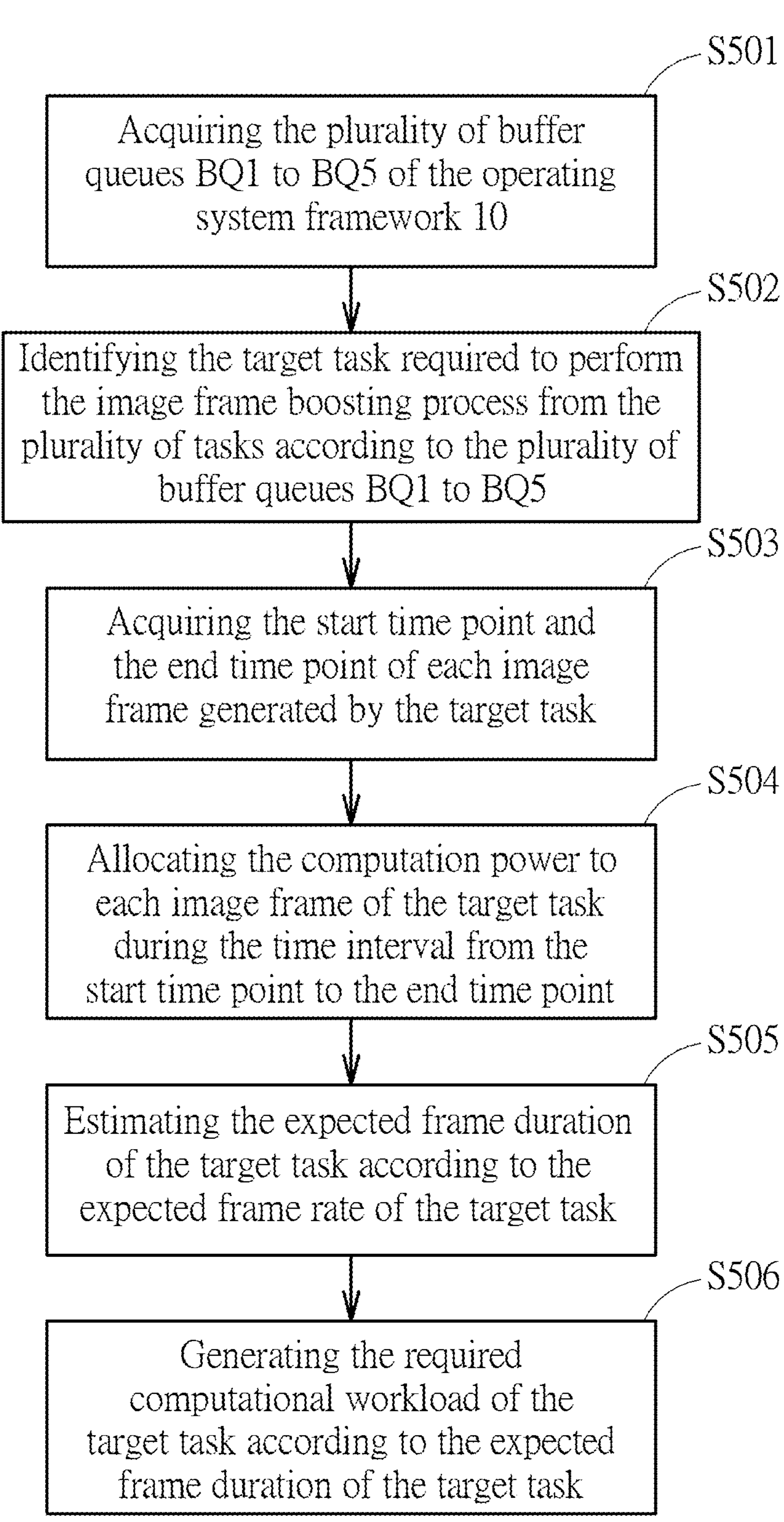
FIG. 5 is a flow chart of performing a computation power allocation method by the computation power allocation system in FIG. 1.

FIG. 5 is a flow chart of performing a computation power allocation method by the computation power allocation system 100. The computation power allocation method includes step S501 to step S506. Any reasonable technology modification falls into the scope of the present invention. Step S501 to step S506 are illustrated below.

- step S501: acquiring the plurality of buffer queues BQ1 to BQ5 of the operating system framework 10;
- step S502: identifying the target task required to perform the image frame boosting process from the plurality of tasks according to the plurality of buffer queues BQ1 to BQ5;
- step S503: acquiring the start time point and the end time point of each image frame generated by the target task;
- step S504: allocating the computation power to each image frame of the target task during the time interval from the start time point to the end time point;
- step S505: estimating the expected frame duration of the target task according to the expected frame rate of the target task;
- step S506: generating the required computational workload of the target task according to the expected frame duration of the target task.

Details of step S501 to step S506 are previously illustrated. Thus, they are omitted here. In the computation power allocation system 100, since each image frame of the target task can be accurately tracked, the computational power can be optimally allocated, thereby reducing power consumption.

To sum up, the present invention discloses a computation power allocation method and a computation power allocation system. First, the computation power allocation system can detect a target task required to perform an image frame boosting process. Second, the computation power allocation system can acquire a start time point and an end time point of each image frame generated by the target task for allocating the computation power. Third, the computational power of required computational workload can be accurately estimated. Therefore, the computation power allocation system can reduce power consumption in addition to providing satisfactory power management performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computation power allocation method comprising:
- acquiring a plurality of buffer queues of an operating system framework;
- identifying a target task required to perform an image frame boosting process from a plurality of tasks according to the plurality of buffer queues;
- acquiring a start time point and an end time point of each image frame generated by the target task;
- allocating computation power to the each image frame of the target task during a time interval from the start time point to the end time point;
- estimating an expected frame duration of the target task according to an expected frame rate of the target task; and
- generating a required computational workload of the target task according to the expected frame duration of the target task;
- wherein each buffer queue of the plurality of buffer queues is used for communicating application programming interfaces of pair-wised tasks.

2. The method of claim 1, further comprising:
- acquiring producer information and consumer information of the each buffer queue;
- wherein identifying the target task required to perform the image frame boosting process from the plurality of tasks according to the plurality of buffer queues, is identifying the target task required to perform the image frame boosting process from the plurality of tasks according to the producer information of the each buffer queue.

3. The method of claim 1, wherein the operating system framework is an Android® framework, the target task of the operating system framework comprises a task of performing a camera function or a task of performing a screen slide function.

4. The method of claim 3, wherein allocating the computation power to the each image frame of the target task during the time interval from the start time point to the end time point comprises:
- allocating the computation power to the each image frame of the target task during a period of generating the each image frame when the target task corresponds to the camera function.

5. The method of claim 4, wherein image frames are generated by the camera function according to camera configurations.

6. The method of claim 3, wherein when the target task corresponds to the screen slide function, the start time point and the end time point of the each image frame is acquired from the operating system framework.

7. The method of claim 6, wherein image frames are discontinuously generated by the screen slide function, and when the screen slide function is temporarily ceased, no computation power is allocated to the screen slide function.

8. The method of claim 1, further comprising:

acquiring a scenario configured by producer information of a buffer queue;

acquiring an expected frame rate corresponding to the scenario configured by the producer information; and boosting a frame rate to reach the expected frame rate when no event is triggered by consumer information of the buffer queue.

9. The method of claim 1, further comprising:

inputting the each image frame to a corresponding buffer queue after the computation power is allocated for generating the each image frame.

10. The method of claim 1, further comprising:

optionally performing the image frame boosting process to a flutter task when the flutter task is used for synthesizing a plurality of image frames generated by different image sources.

11. A computation power allocation system comprising:

an operating system framework configured to provide an application platform of performing a plurality of tasks;

a processor linked to the operating system framework; and a memory coupled to the processor;

wherein the processor acquires a plurality of buffer queues of the operating system framework, the processor identifies a target task required to perform an image frame boosting process from the plurality of tasks according to the plurality of buffer queues, the processor acquires a start time point and an end time point of each image frame generated by the target task, the processor allocates computation power to the each image frame of the target task during a time interval from the start time point to the end time point, the processor estimates an expected frame duration of the target task according to an expected frame rate of the target task, the processor generates a required computational workload of the target task according to the expected frame duration of the target task, the expected frame duration, the expected frame rate, and the required computational workload are saved in the memory, and each buffer queue of the plurality of buffer queues is used for communicating application programming interfaces of pair-wised tasks.

12. The system of claim 11, wherein the processor acquires producer information and consumer information of the each buffer queue, and the processor identifies the target task required to perform the image frame boosting process from the plurality of tasks according to the producer information of the each buffer queue.

13. The system of claim 11, wherein the operating system framework is an Android® framework, the target task of the operating system framework comprises a task of performing a camera function or a task of performing a screen slide function.

14. The system of claim 13, wherein the processor allocates the computation power to the each image frame of the target task during a period of generating the each image frame when the target task corresponds to the camera function.

15. The system of claim 14, wherein image frames are generated by the camera function according to camera configurations.

16. The system of claim 13, wherein when the target task corresponds to the screen slide function, the processor acquires the start time point and the end time point of the each image frame is from the operating system framework.

17. The system of claim 16, wherein image frames are discontinuously generated by the screen slide function, and when the screen slide function is temporarily ceased, no computation power is allocated to the screen slide function.

18. The system of claim 11, wherein the processor acquires a scenario configured by producer information of a buffer queue, the processor acquires an expected frame rate corresponding to the scenario configured by the producer information, and the processor boosts a frame rate to reach the expected frame rate when no event is triggered by consumer information of the buffer queue.

19. The system of claim 11, wherein the each image frame is inputted to a corresponding buffer queue after the computation power is allocated for generating the each image frame.

20. The system of claim 11, wherein the processor optionally performs the image frame boosting process to a flutter task when the flutter task is used for synthesizing a plurality of image frames generated by different image sources.

* * * * *